(No Model.) 3 Sheets—Sheet 1.
J. F. STEWARD.
SHEAF CARRIER FOR SELF BINDING HARVESTERS.
No. 482,931. Patented Sept. 20, 1892.

Witnesses.
Arthur Johnson
Frank G. Middlekauff

Inventor.
John F. Steward (No Model.) 3 Sheets—Sheet 2.

J. F. STEWARD.
SHEAF CARRIER FOR SELF BINDING HARVESTERS.

No. 482,931. Patented Sept. 20, 1892.

Witnesses
Arthur Johnson
Frank G. Middlekauff

Inventor.
John F. Steward (No Model.) 3 Sheets—Sheet 3.
J. F. STEWARD.
SHEAF CARRIER FOR SELF BINDING HARVESTERS.
No. 482,931. Patented Sept. 20, 1892.
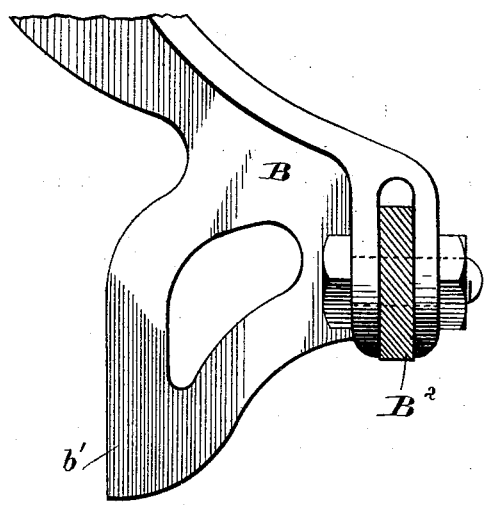
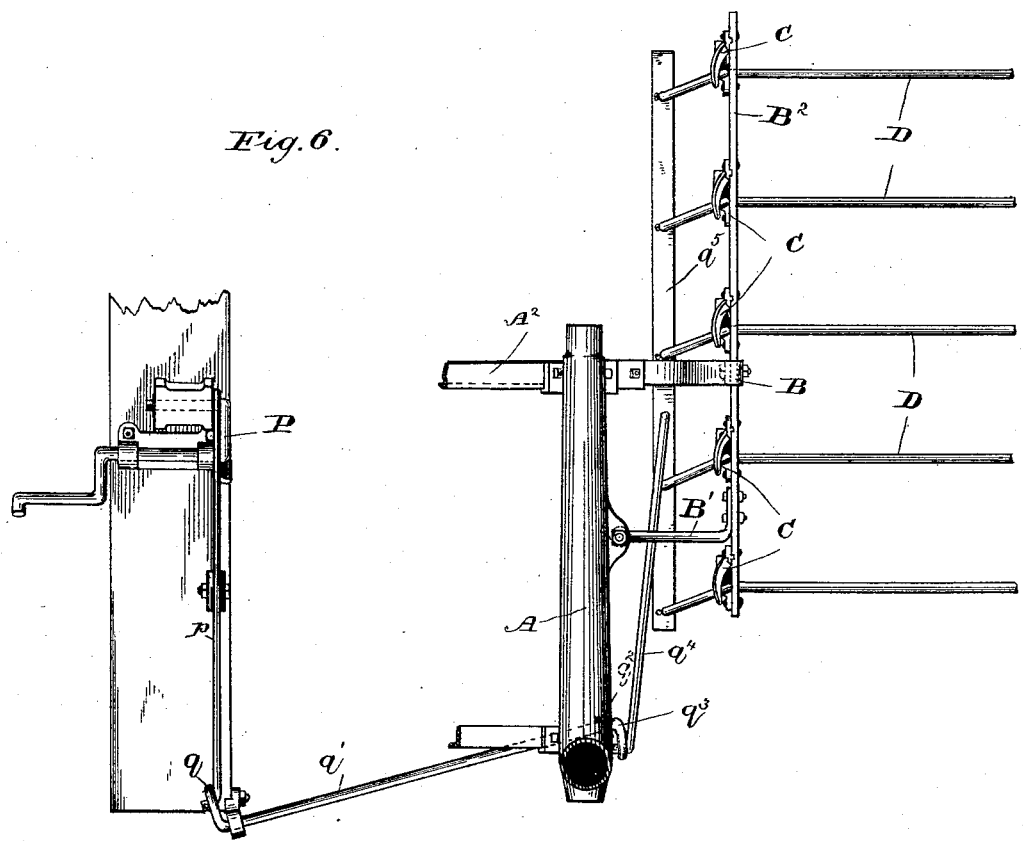
Witnesses.
Arthur Johnson.
Frank G. Middlekauff.
Inventor.
John F. Steward

UNITED STATES PATENT OFFICE.

JOHN F. STEWARD, OF CHICAGO, ILLINOIS.

SHEAF-CARRIER FOR SELF-BINDING HARVESTERS.

SPECIFICATION forming part of Letters Patent No. 482,931, dated September 20, 1892.

Application filed June 24, 1891. Serial No. 397,348. (No model.)

*To all whom it may concern:*

Be it known that I, JOHN F. STEWARD, of Chicago, in the county of Cook and State of Illinois, have invented certain new and useful Improvements in Sheaf-Carriers for Self-Binding Harvesters, of which the following is a full description, reference being had to the accompanying drawings, in which—

Figure 1:
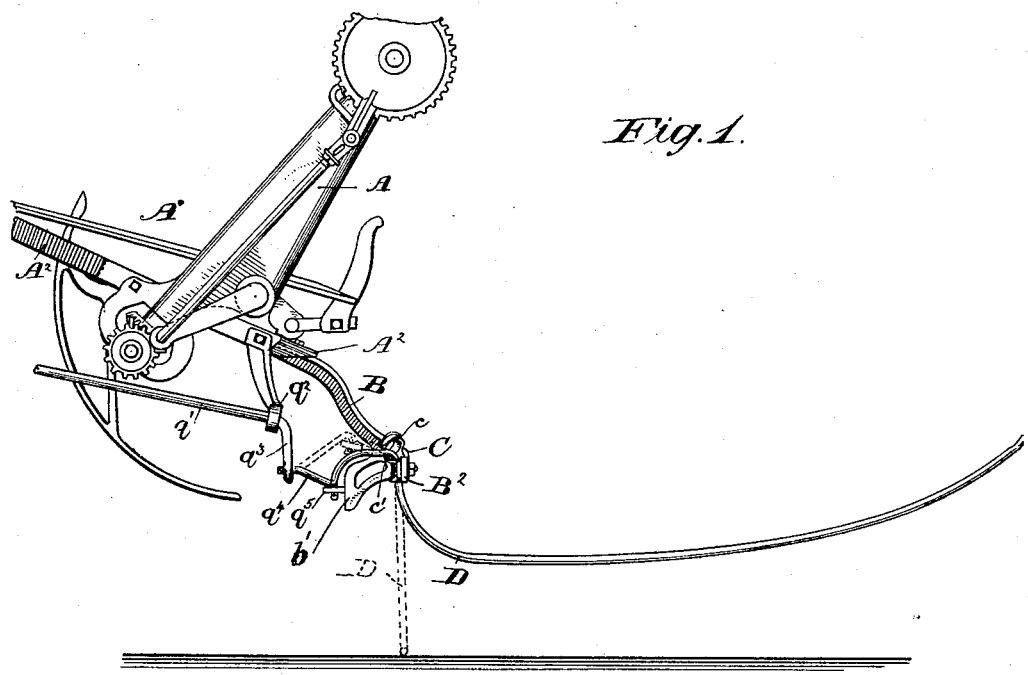
Figure 2:
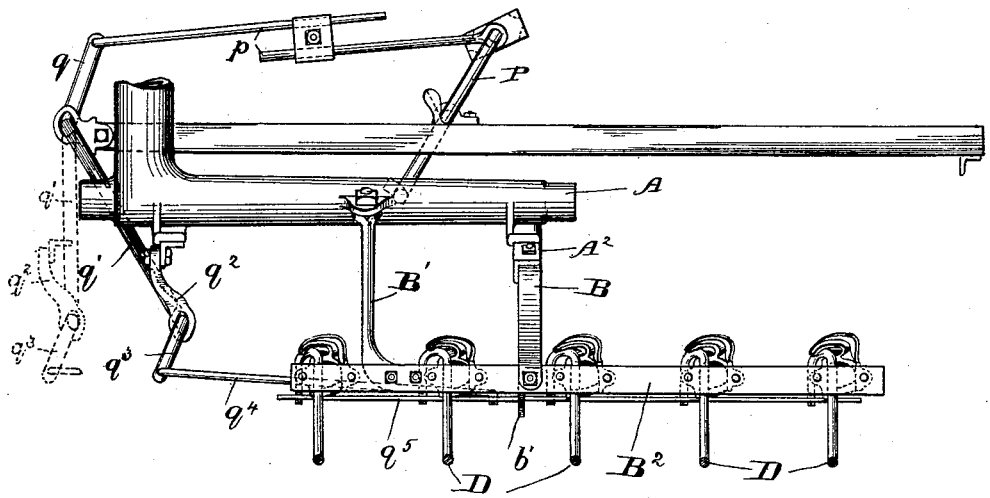
Figure 3:
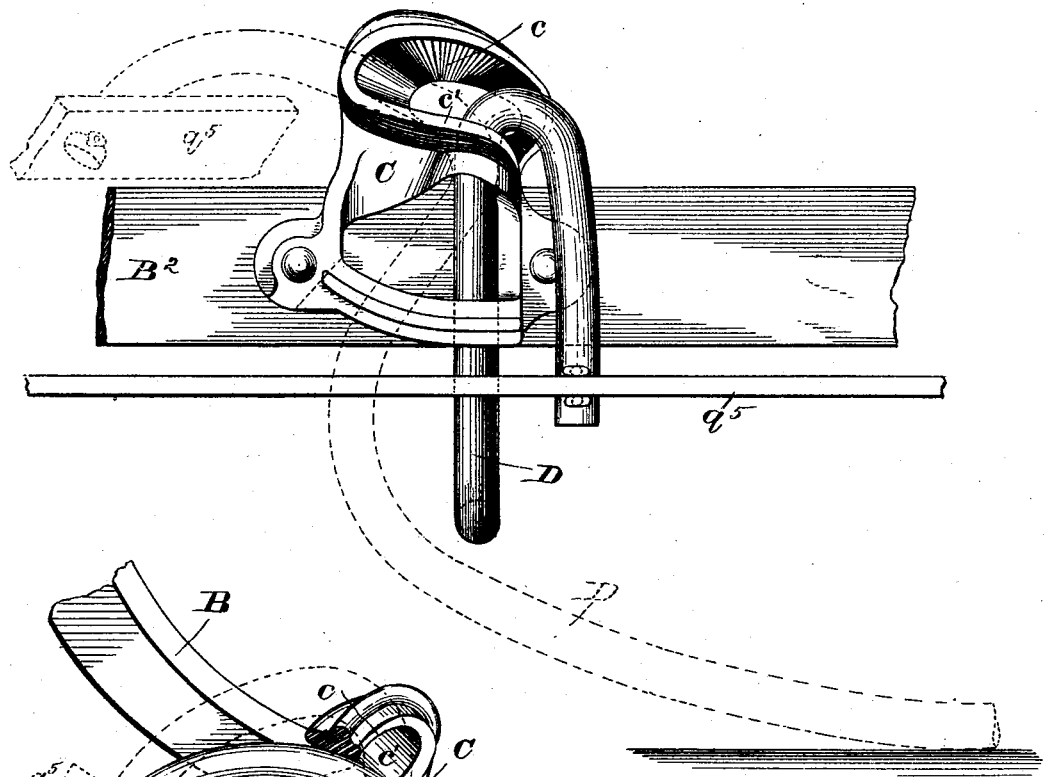
Figure 4:
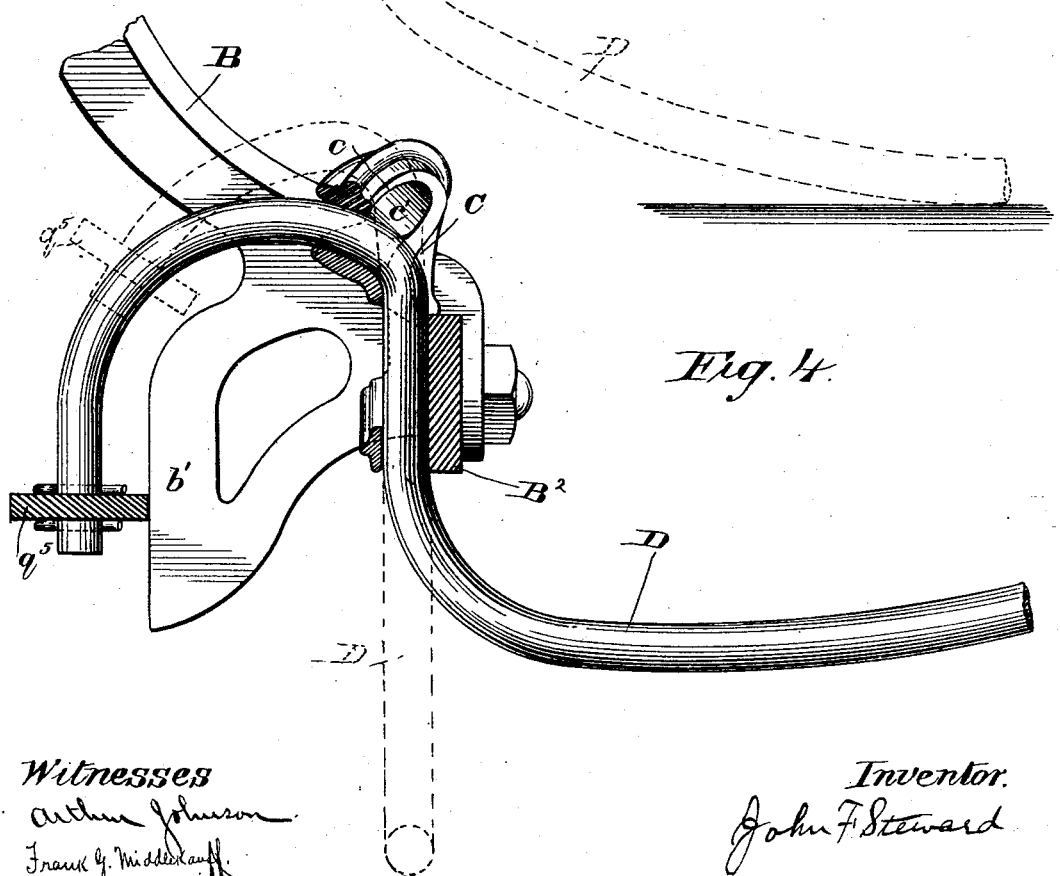

Figure 1 is a rear elevation; Fig. 2, a side elevation; Fig. 3, a side elevation of the finger-supporting bearing; Fig. 4, a rear sectional view of the same parts as shown in Fig. 3; Fig. 5, a detail of the means for securing the finger-supporting bar to its supporting-arm. Fig. 6 is a reduced plan view showing the position of the sheave-carrier relative to the seat-board.

This invention relates to that class of carriers in which the fingers have a double-jointed connection with the supporting-bar, as shown in the patent to Kennedy and Steward, No. 405,892, of June 25, 1889, and the patent to Lucien W. Ellis, No. 401,259, of April 9, 1889; and the invention consists in the placement of the cam for guiding the teeth, so as to act upon that part of the tooth which extends from the axis toward the controlling-bar for the fingers, and in other arrangements and combinations of parts hereinafter pointed out and claimed.

I have shown only so much of a self-binder and binding-table as necessary to give the position of the carrier relative thereto. The form of binder in part shown is one now in common use, with the exception of the arrangement of the gearing, which, however, I do not claim, as that is the invention of Orren S. Ellithorp.

A is the main frame of the binding attachment, A' the binder-table, and A² that main sill of the binder which is at a point about in line with the knotting device and needle, and in fact about central with the grain being handled. To that sill I bolt the arm B, which extends outward and downward, where it is preferably split, as shown in dotted lines and full lines in Fig. 5, to receive the finger-supporting bar B². The fingers D are pivoted to the supporting-bar through the instrumentality of parts C, which bolt to the said bar and permit the finger to lie between them and the bar, as will be seen in Fig. 3 and as may be understood by reference to the other figures. These two parts form a slot between them, and in respect to the slot for the axis of the fingers they follow the Kennedy and Steward patent; but, unlike the latter, the fingers do not fall to the end of the slot, the slot being made so long that they shall not and it but forms a kind of guide.

Turning now to Fig. 4 it will be observed that the fingers D extend downward and outward and then slightly upward, as shown in full in Fig. 1. The axis extends substantially vertical between the casting which forms their support and the bar to which the latter is connected, as seen in Figs. 3 and 4, and from thence over and down to the finger-connecting bar. The part of the tooth immediately above the axis is controlled within a cam-shaped slot in the casting C. (Best shown in Fig. 3, where c and c' form the stop and cam surfaces which control the tooth and cause it to move from a position extending outward from the supporting-bar, in which position it receives the sheaves, to one rearward and downward to permit discharge.) This slot is preferably made open, as seen in Figs. 1 and 2, only for the purpose of passing the teeth into it, the opening having no other function.

In Figs. 3 and 4 the fingers are shown in full lines in position for receiving the bundles and in the same figures are shown in dotted lines in position for discharging the bundles—that is, swung rearward—and the finger ends in a lower position.

The supporting-bar B is, as stated, very near the middle of the carrier, and hence near the center of gravity of the bundles; but in order to steady the carrier I provide the support B', which extends down from the binder-frame to a point near the rear end of the carrier-bar.

The binder is adapted to move fore and aft in adjusting for binding long and short grain, and the bundle-carrier is carried therewith. In order that it may be operated from the driver's seat in any of its positions of adjustment, or rather regardless of such positions, I provide the following device:

As shown in Figs. 2 and 6, some distance grainward of the binder attachment in its usual position upon the harvester is the pedal-arm P and pedal-block and adjustable link $p$, linked to an arm $q$ of the shaft $q'$, supported in a hanger $q^2$ on the binder-frame. At the lower end of the shaft is the arm $q^3$. From this arm is passed the link $q^4$, which passes to the finger-connecting bar at $q^5$. By the rocking action of this shaft the fingers are thrown into and out of position. The upper end of the shaft $q'$ is loosely journaled in an eye on the seat-board of the harvester and the lower end of the same to the support $q^2$ on the adjustable binder. The lower and stubbleward end of the shaft is thus adapted to move back and forth as the binder is adjusted. The shaft alone is shown in Fig. 2 in its foremost adjustment in full lines and in its rearmost adjustment in dotted lines. It will be understood, of course, that in such a case the binder and carrier are also adjusted, and hence that the length of the link $q^4$ is not changed in effect.

In order to stop the teeth from moving forward at their outer ends, I provide a stop $b'$, against which the finger-controlling bar may strike.

The part $c$ of the casting C, I have spoken of as controlling the tooth and causing it to move through the proper path; but it serves an additional purpose—that of preventing the fingers from sliding upward and becoming cramped in the bearing when passing over obstructions and compelling them to yield by rising at the free end.

What I claim as my invention, and desire to secure by Letters Patent, is—

1. A sheaf-carrier finger-joint consisting of a part secured to the broad vertical side of a bar, so as to leave a space between the said bar and said part, that the vertical axis of the finger may be free to swing at its lower end, said space at its upper end constricted to form a swivel-joint, in which the vertical axis of the finger may rock as well as turn, said finger having an arm extended from the part forming its axis to adapt it to receive a bar that shall connect said finger with others, said arm controlled between the axis of movement of the finger and the connecting-bar by a limiting-stop $c$, substantially as described.

2. A sheaf-carrier finger-joint consisting of a broad-faced bar and a joint-piece secured thereto, the vertical axis of the finger lying in a space between the joint-piece and the flat bar, the said joint-piece adapted to form a broad slot below and a constricted throat above, whereby the finger-joint may shift at the lower part of the bearing at the swivel-joint formed by the throat of said joint-piece, the said finger having an arm extending from its vertical axis and said joint-piece having a cam $c'$ below the said arm and the stop $c$ above said arm to aid in controlling the movement of the said arm and through it the movement of the finger, substantially as described.

3. A sheaf-carrier finger-joint consisting of a supporting-bar having a broad side, a joint-piece so secured to said bar as to leave a space for the axis of the finger to turn and to slide at the lower part of the joint-piece, said finger having an arm extending from the vertical axis whereby the finger may be moved, a stop and cam as one piece with the said joint-piece adapted to control the arm of the said finger, consisting of the surfaces $c$ and $c'$, the arm of the finger practically moving in a slot, but said slot cut away at one end, whereby when the finger is turned sufficiently far on its axis the arm part of the finger will have been moved sufficiently far to escape the action of the uppermost stop, so that it may be lifted upward and drawn out of the joint or by a reversal of the movement a new tooth may be substituted, substantially as described.

4. A sheaf-carrier finger-joint consisting of a broad-sided bar, a joint-piece secured to said bar, so as to leave a space between said bar and joint-piece for the axis of the finger to shift, said finger having an arm substantially at right angles to said axis, said joint-piece having integral with itself the stop and cam surfaces $c$ and $c'$, substantially as described.

JOHN F. STEWARD.

Witnesses:
ARTHUR JOHNSON,
A. L. UPTON.